R. F. HOBBS.

TOILET ARTICLE.

APPLICATION FILED SEPT. 30, 1916.

Reissued Aug. 19, 1919. 14,710.

WITNESSES

INVENTOR

Robert F. Hobbs

BY

ATTORNEYS

THE COLUMBIA PLANOGRAPH CO., WASHINGTON, D. C.

UNITED STATES PATENT OFFICE.

ROBERT F. HOBBS, OF GREAT NECK, NEW YORK.

TOILET ARTICLE.

14,710. Specification of Reissued Letters Patent. Reissued Aug. 19, 1919.

Original No. 1,173,802, dated February 29, 1916, Serial No. 61,946, filed November 17, 1915. Application for reissue filed September 30, 1916. Serial No. 123,182.

*To all whom it may concern:*

Be it known that I, ROBERT F. HOBBS, a citizen of the United States, and a resident of Great Neck, in the county of Nassau and State of New York, have invented a new and Improved Toilet Article, of which the following is a full, clear, and exact description.

Among the principal objects which the present invention has in view are: to provide a box-like member for use as a soap receptacle; to provide means for uniting pieces of sponge, separable to receive therebetween soap in free contact with both pieces of sponge; and to provide means for uniting several relatively small sponges to form a larger sponge.

*Drawings.*

*Description.*

Figure 1:
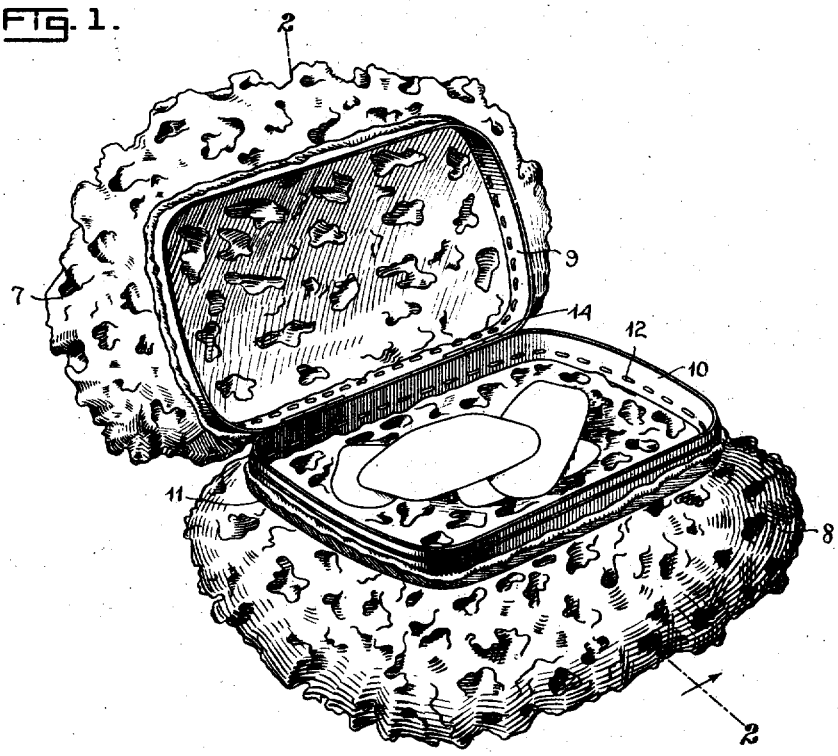
Figure 1 is a perspective view of an article of the character mentioned constructed and arranged in accordance with the present invention.
Figure 2:
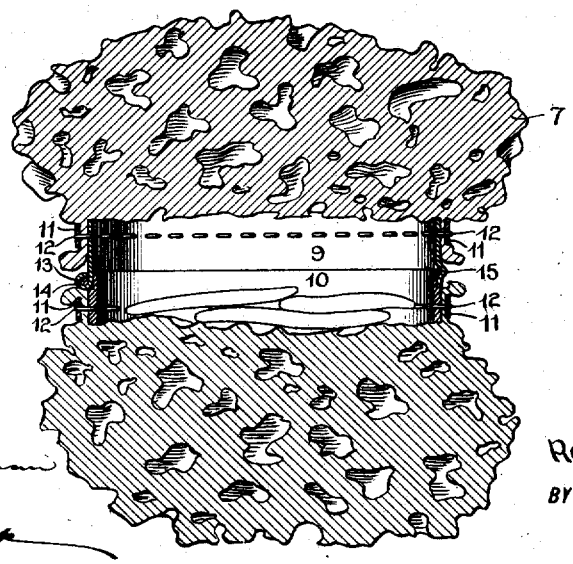
Fig. 2 is a cross section of the same, the section being taken as on the median line 2—2 of Fig. 1.

As seen in the drawings, two sponges designated by the numerals 7 and 8 respectively, are mounted on the frames 9 and 10 respectively, by being sewed thereto. To hold the sponges on the frames 9 and 10, the covering sections of the said sponges are encircled by girdles 11 of any suitable fabric. The frames 9 and 10, are suitably pierced to receive a thread 12 by which the girdles 11 and interposed sections of the sponges 7 and 8 are secured to the said frames.

The frames 9 and 10 are constructed from any suitable material, light metal or celluloid being preferred, and are united by a hinge pin 13, which is threaded through knuckles 14 formed on the two frames. Opposite the hinge formed by the pin 13 and knuckles 14, a spring lock 15 is formed which holds the frames in closed relation resisting any normal pull tending to open the same and yielding to an excess pull having this object in view.

The sponges 7 and 8 form the covering sides of the frames 9 and 10, and in conjunction therewith constitute a box or receptacle for soap. When the soap is disposed within the receptacle thus formed, it is kneaded or rubbed by the surface of the sponges, to form a lather within the receptacle and gradually permeates the sponges 7 and 8. A toilet article is thus formed, which is peculiarly convenient as a bath accessory.

It will be understood that the article herein described may be used as a receptacle or depository for remnants or bits of soap which otherwise would be lost or destroyed.

When in the course of operation, it is found desirable to cleanse the article, the frames 9 and 10 are opened and any bits of soap remaining in the receptacle are removed. Then by subjecting the surfaces of the sponges within the frames 9 and 10 to hot water, the sponges may be thoroughly and perfectly cleansed.

While the preferred method of securing the sponges 7 and 8 to the frames 9 and 10 has been described as one employing thread for sewing the sponges on the frames, it will be understood that I may use any conventional form or method for securing said frames and sponges. Also, I do not desire to be understood as limiting my claims to frames united by hinges, as the same purpose might be effected by telescopically disposed, and frictionally or spring held, frame members of conventional form. In making the article of my invention I may use material other than animal sponge as, for example, rubber sponge or any other water permeable, compressible, and resilient material.

*Claims.*

1. A toilet article of the class described comprising a plurality of soft resilient covering sides, said sides being freely permeable by water; means for pivotally connecting said sides to open bookwise; and means for locking said sides in service relation to form a closed soap receiving pocket therebetween.

2. An article of the class described comprising a plurality of pivotally united open-centered spreading frames; a plurality of cover sides therefor permanently united therewith, said sides being formed from soft resilient rubbing material freely permeable by water; and means for locking said frames in service relation.

3. An article of the class described comprising a plurality of open-centered hinged frames; a plurality of sponges permanently connected with said frames to form cover sides therefor; and means for holding said frames locked in service relation.

4. An article of the class described comprising a pair of soft resilient body rubbing cover members freely permeable to water and attached to frames which are operatively united so as to constitute a receptacle, substantially as and for the purpose set forth.

In testimony whereof I have hereunto set my hand.

ROBERT F. HOBBS.

Copies of this patent may be obtained for five cents each, by addressing the "Commissioner of Patents, Washington, D. C."